(12) United States Patent
Takamatsu

(10) Patent No.: US 7,215,517 B2
(45) Date of Patent: May 8, 2007

(54) CONSTANT-VOLTAGE SWITCHING POWER SUPPLY PROVIDED WITH OVERVOLTAGE OUTPUT PROTECTING CIRCUIT, AND ELECTRONIC APPARATUS PROVIDED WITH OVERVOLTAGE PROTECTING CIRCUIT

(75) Inventor: Seiji Takamatsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 452 days.

(21) Appl. No.: 10/431,571

(22) Filed: May 8, 2003

(65) Prior Publication Data

US 2004/0021992 A1    Feb. 5, 2004

(30) Foreign Application Priority Data

| May 8, 2002 | (JP) | ............................ P2002-133295 |
| Dec. 12, 2002 | (JP) | ............................ P2002-360794 |
| May 7, 2003 | (JP) | ............................ P2003-128899 |

(51) Int. Cl.
*H02H 7/00* (2006.01)
*H02M 3/24* (2006.01)

(52) U.S. Cl. ...................................... 361/18; 363/21.15

(58) Field of Classification Search .................. 361/18; 363/21.1, 21.15
See application file for complete search history.

(56) References Cited

U.S. PATENT DOCUMENTS 5,818,670 A * 10/1998 Ahn ............................ 361/18
5,917,716 A * 6/1999 Cho ........................... 363/21.14
6,094,362 A * 7/2000 Domingo ..................... 363/56.1
6,229,681 B1 * 5/2001 Lee ............................. 361/92
6,256,179 B1 * 7/2001 Yamada et al. ................ 361/18
6,816,392 B2 * 11/2004 Takamatsu ................. 363/21.15

FOREIGN PATENT DOCUMENTS

| JP | 57-159395 U | 10/1982 |
| JP | 2087970 | 3/1990 |
| JP | 4042774 | 2/1992 |
| JP | 7059339 | 3/1995 |
| JP | 8-256474 | 10/1996 |
| JP | 9163741 | 6/1997 |
| JP | 9285114 | 10/1997 |
| JP | 11235028 | 8/1999 |
| JP | 2001-5576 | 1/2001 |
| JP | 2003-72057 | 3/2003 |

* cited by examiner

*Primary Examiner*—Brian Sircus
*Assistant Examiner*—Boris Benenson
(74) *Attorney, Agent, or Firm*—Sughrue Mion, PLLC

(57) ABSTRACT

An overvoltage output protector is electrically connected to a constant-voltage switching power supply which includes a switching transistor converting a DC voltage obtained by smoothing an AC voltage supplied from an AC power source into a cyclic pulse signal. In the overvoltage output protector, an overvoltage monitor whether a potential of the cyclic pulse signal is a predetermined value or more. A deactivator turns off the switching transistor in a case where the overvoltage monitor judges that the potential of the cyclic pulse signal is the predetermined value or more.

10 Claims, 6 Drawing Sheets

CONSTANT-VOLTAGE SWITCHING POWER SUPPLY PROVIDED WITH OVERVOLTAGE OUTPUT PROTECTING CIRCUIT, AND ELECTRONIC APPARATUS PROVIDED WITH OVERVOLTAGE PROTECTING CIRCUIT

BACKGROUND OF THE INVENTION

The present invention relates to a constant-voltage switching power supply provided with an overvoltage output protecting circuit, and relates to and an electronic apparatus provided with an overvoltage protecting circuit.

A constant-voltage switching power supply rarely generates unnecessary power as heat from a transistor since a switching transistor therein only repeats the ON-OFF switching operation. The constant-voltage switching power supply uses a compact and small-loss high-frequency transformer. Thus the constant-voltage switching power supply is advantageous in that the power loss of the entire circuit can be made small. FIG. 3 is a circuit diagram showing an example of a related-art constant-voltage switching power supply.

A smoother 1 comprising a rectifier bridge DB1 and a capacitor C11 smoothes the AC voltage supplied from an AC power source Vin to convert the AC voltage to a DC voltage. The DC voltage is switched by a switching transistor (field-effect transistor) Q1 and converted to a high-frequency pulse. The high-frequency pulse is transformed by a high-frequency transformer T1 then converted to a DC voltage again by a high-frequency rectifier 2 and outputted across a Vout terminal and a GND terminal. In a case where there is a variation in the output voltage, the voltage comparator/detector 3 detects a variation in the voltage and notifies that to a duty ratio controller 4 via a photocoupler PC1. The duty ratio controller 4 changes the ON-OFF interval of the switching transistor Q1 to control the duty ratio of the high-frequency pulse. The average voltage of the high-frequency pulse becomes the DC output voltage and the output voltage is controlled by the duty ratio. Control of the duty ratio of the high-frequency pulse is made so that, when the DC output voltage is higher, the ON duty will be smaller and when the DC output voltage is lower, the ON duty will be greater.

In the related-art constant-voltage switching power supply of this configuration; an AC voltage supplied from the AC power source Vin is converted to a DC voltage by the smoother 1, and the DC voltage causes a current to flow through an activation resistor R1, thus elevating the gate voltage of the switching transistor Q1. This turns on the switching transistor Q1 and generates a voltage on a first primary coil of the high-frequency transformer T1 and a phase-inverted voltage corresponding to the number of turns on a second primary coil P2. The voltage generated in the second primary coil applies a positive feedback on the gate of the switching transistor Q1 via a capacitor C1 and a resistor R2. The base of the transistor Q2 is charged by a coupler current of a photocoupler PC1 which feeds back a variation in the DC output voltage and a current flowing through a Zener diode ZD1.

When a current flows through the first primary coil P1, a current attempts to flow through the secondary wiring S1 of the high-frequency transformer T1. The diode D1 blocks the current so that the corresponding energy is stored in the high-frequency transformer T1. When the base voltage of the transistor Q1 reaches the ON voltage, the switching transistor Q1 turns off, causing the energy to be transmitted from the secondary wiring S1. On the second primary coil P2 is applied a reverse bias thus causing the base of the transistor Q2 to be discharged. When all the energy stored in the high-frequency transformer T1 is generated from the secondary wiring S1, the switching transistor Q1 starts to turn on again with a counterelectromotive force.

A high-frequency pulse is generated by repeating the above operation. Then the transistor Q2 is ON-OFF controlled by the coupler current of the photocoupler PC1 which feeds back a variation in the DC output voltage. This causes ON-OFF control of the transistor Q1, which controls the duty ratio of the high-frequency pulse. Thus a voltage specified by a Zener diode ZD2 is stably outputted at the DC output terminal Vout.

An overvoltage detector 26 detects whether the DC output voltage defined by a Zener diode ZD3 is overvoltage, and transmits the overvoltage thus detected to a switching transistor deactivator 5 through a photocoupler PC2. In the overvoltage detector 26, when the DC output voltage becomes an overvoltage, the photocoupler PC2 in the overvoltage detector 26 is turned ON to operate the switching transistor deactivator 5 by the coupler current of the photocoupler PC2 in the switching transistor deactivator 5. The switching transistor deactivator 5 turns OFF the switching transistor Q1, thereby stopping the switching operation of the switching transistor Q1.

Accordingly, when the photocoupler PC1 of the voltage comparator/detector 3 breaks down so that constant-voltage control is disabled and the DC output voltage is abnormally raised to be an overvoltage, for example, the overvoltage detector 26 can detect an overvoltage to stop the operation of the constant-voltage switching power supply, thereby preventing heat from being generated by the overvoltage.

However, the voltage comparator/detector 3 and the overvoltage detector 26 have such circuit configurations as to depend on the photocouplers provided across the primary and secondary sides of the high-frequency transformer T1. For this reason, when some abnormality is occurred on the secondary side of the high-frequency transformer T1 by the breakdown of a load connected to the secondary side of the high-frequency transformer T1, there is an anxiety that both the photocoupler PC1 and the photocoupler PC2 might break down. Consequently, there is an anxiety that neither the duty ratio controller 4 nor the switching transistor deactivator 5 on the primary side of the high-frequency transformer T1 might function and the control of the switching transistor Q1 might be perfectly disabled to cause the DC output voltage to be the overvoltage.

For another related art, an overvoltage protecting circuit is disclosed in Japanese Patent Publication No. 8-256474A. The overvoltage protecting circuit relates to a self-excitation type switching power source and has an object to protect a load from an abnormal rise in an output voltage which is caused by the breakdown of a power supply. The overvoltage protecting circuit is provided with: an ON period limiter for limiting the ON period of a switching transistor; a negative rectifier for taking a negative voltage from the feedback coil of a switching transformer; and a detector for detecting whether the output voltage of the negative rectifier is a predetermined value or less. The overvoltage protecting circuit is so configured that the output voltage of the negative rectifier is also dropped proportionally when the output voltage is raised, and a detection signal is transmitted from the detector to the ON period limiter in a case where the output voltage becomes the predetermined value or less, so that the ON period of the switching transistor is thus limited. Also in this overvoltage protecting circuit, the overvoltage problem as explained the above might be occurred.

In a general electronic apparatus comprising a power supply device such as a constant-voltage switching power supply or an electronic apparatus having such a structure that a power supply device is not provided therein but a power is supplied from an external power supply device such as an AC adapter, an overcorrent might flow to a part of circuits to damage them and a part of the circuits might generate heat to have a high temperature when an abnormality occurs on the power supply device and a much higher voltage than a rated voltage is applied to the circuits in the electronic apparatus.

For this reason, a general power supply device is provided with an output overvoltage protecting circuit for preventing an output voltage from becoming an overvoltage. On the other hand, there is also an anxiety that an overvoltage might be generated in a part of the circuits in the electronic apparatus by the abnormality occurred on the circuits in the electronic apparatus even if the power supply device is normally operated. Also in such a case, similarly, there is an anxiety that an overcorrent might flow to a part of the circuits to damage them and a part of the circuits might generate heat to have a high temperature. In the general electronic apparatus, therefore, an overvoltage protecting circuit for preventing the voltage of the circuit in the electronic apparatus from being a predetermined value or more is provided separately from the output overvoltage protecting circuit of the power supply device.

For example, Japanese Patent Publication No. 2001-5576A discloses an overvoltage protecting circuit for clamping the voltage of a circuit in an electronic apparatus by a Zener diode to prevent an overcorrent from flowing to a part of the circuits in the electronic apparatus, thereby preventing the circuits from being broken and preventing heat generation from being caused in the circuits in the electronic apparatus.

In such a configuration, since a power is continuously supplied from a power supply device, an overvoltage is clamped by the Zener diode so that a large current might continuously flow to the Zener diode to generate heat. In the case where a larger current than a rated current flows to the Zener diode, the Zener diode is broken down. In many cases, the breakdown of the Zener diode caused by such an overcurrent brings a short-circuit breakdown, that is, a short-circuited state. Consequently, an output overcurrent is detected on the power supply device side so that the power supply device is stopped and both the power supply device and the electronic apparatus are protected from an overvoltage.

However, in the case where the Zener diode causes an open breakdown, there is an anxiety that the voltage in the electronic apparatus cannot be clamped to generate an overvoltage so that an overcurrent might flow to a part of the circuits. Therefore, the circuits might be broken down, and at the same time, a part of the circuits might generate heat to have a high temperature.

Moreover, many of general electronic apparatuses have such a structure that a DC voltage supplied from a power supply device is converted depending on each of circuits in the electronic apparatus by a voltage output circuit such as a DC-DC converter. For example, Japanese Patent Publication No 2003-72057A discloses a circuit for ON/OFF controlling the output voltage of a DC-DC converter. In such a configuration, the output voltage of a voltage output circuit such as a DC-DC converter is OFF controlled to prevent an overcorrent from flowing to a part of the circuits in the electronic apparatus, thereby preventing the circuit from being broken and preventing heat generation from being caused in the circuits in the electronic apparatus.

However, since the power is continuously supplied from the power supply device also after the overvoltage is detected in the electronic apparatus in the same manner as explained the above, in the case where an abnormality is occurred in the voltage output circuit such as a DC-DC converter, there is an anxiety that an overcorrent might flow to a part of the circuits and the circuits might be thereby broken, and at the same time, a part of the circuits might generate heat to have a high temperature.

SUMMARY OF THE INVENTION

It is therefore an object of the invention to prevent the control of a switching transistor from being disabled to cause a DC output voltage to become an overvoltage when some abnormality is occurred on the secondary side of the high-frequency transformer of a constant-voltage switching power supply circuit.

It is also an object of the invention to prevent an overcorrent from flowing to a part of circuits due to an overvoltage in an electronic apparatus, which causes excessive heat generation.

In order to achieve the above object, according to the invention, there is provided a constant-voltage switching power supply, comprising:

a smoother, which converts an AC voltage supplied from an AC power source into a first DC voltage;

a switching transistor, which converts the first DC voltage into a first cyclic pulse signal;

a transformer, which voltage-transforms the first cyclic pulse signal to obtain a second cyclic pulse signal;

an overvoltage monitor, which judges whether a potential of the first cyclic pulse signal is a predetermined value or more; and a deactivator, which turns off the switching transistor in a case where the overvoltage monitor judges that the potential of the first cyclic pulse signal is the predetermined ratio or more.

When the DC output voltage obtained by rectifying the second cyclic pulse signal increases, the potential of the first cyclic pulse signal also increases. Therefore, it is possible to detect the overvoltage of the DC output voltage by monitoring the potential of the first cyclic pulse signal. For this reason, the DC output voltage is not directly monitored on the secondary side of the transformer differently from the related-art configuration, but the potential of the first cyclic pulse signal output from the switching transistor is monitored at the primary side of the transformer to indirectly monitor the DC output voltage.

When the potential of the first cyclic pulse signal reaches a predetermined value, that is, the DC output voltage becomes the overvoltage, the switching transistor is OFF controlled so that the switching operation of the constant-voltage switching power supply circuit can be stopped. Even if some abnormality is occurred on the secondary side of the transformer, accordingly, the overvoltage of the DC output voltage is monitored without the influence, and the switching operation of the constant-voltage switching power supply circuit can be stopped quickly when the overvoltage is detected.

In the related-art configuration, since a photocoupler provided across the primary side and secondary side of the transformer to be mounted should have a high insulating property at a predetermined interval or more between a terminal connected to the primary side and a terminal connected to the secondary side, a comparatively large-sized photocoupler is to be mounted. According to the above configuration, since the overvoltage of the DC output voltage is detected on the primary side of the transformer, such a photocoupler as in the related-art configuration is not required. Therefore, the number of components of a circuit can be decreased, resulting in a reduction in the component mounting space of the constant-voltage switching power supply circuit.

Here, it is preferable that: the overvoltage monitor outputs a deactivation signal having a predetermined DC voltage, in a case where it is judged that the potential of the first cyclic pulse signal is the predetermined value or more; and the deactivator maintains a base potential of the switching transistor at a deactivating potential at which the switching transistor is turned off, in a case where the overvoltage monitor outputs the deactivation signal.

Here, it is further preferable that the deactivator comprises a self holding circuit which maintains the base potential of the switching transistor at the deactivating potential even in a case where the overvoltage monitor stops outputting the deactivation signal, after the deactivator is once activated.

When the overvoltage is detected and the deactivator is operated, there is a high possibility that some abnormality might be caused on the load connected to the DC voltage output side. For this reason, even if the condition is once returned to such a state that the overvoltage is not detected, the overvoltage would be detected again.

According to the above configuration, it is possible to continuously maintain a state in which the voltage is not output to the DC voltage output side even if the state in which the overvoltage is not detected is returned after the overvoltage is once detected. Consequently, the output overvoltage protection of the constant-voltage switching power supply can be carried out more stably and reliably.

It is also preferable that: the transformer comprises a first primary coil to which the first cyclic pulse signal is applied, a second primary coil at which a third cyclic pulse signal substantially as same as the first cyclic pulse signal is induced; and the overvoltage monitor monitors a potential of the third cyclic pulse signal to judge whether the potential of the first cyclic pulse signal is the predetermined value or more.

When the first cyclic pulse signal output from the switching transistor is applied to the first primary coil, the third cyclic pulse signal is induced to the second primary coil of the transformer at a potential corresponding to a coil ratio of the first primary coil to the second primary coil. Accordingly, when the potential of the first cyclic pulse signal is raised, the potential of the third cyclic pulse signal is also raised.

Here, it is preferable that the overvoltage monitor comprises a Zener diode through which a backward current flows to operate the deactivator in a case where the potential of the third cyclic pulse signal reaches a Zener voltage of the Zener diode.

Setting the Zener voltage of the Zener diode of the overvoltage detector to be the potential of the third cyclic pulse signal when the DC output voltage becomes the overvoltage, the deactivator is operated with the backward current of the Zener diode which flows when the potential of the third cyclic pulse signal reaches the Zener voltage of the Zener diode. When the DC output voltage becomes the overvoltage, consequently, the switching operation of the constant-voltage switching power supply circuit can be stopped.

Here, it is further preferable that the potential of the third cyclic pulse signal is defined with respect to a ground potential.

In such a configuration, more precise detection of the overvoltage can be attained.

It is also preferable that: the overvoltage monitor comprises a transistor having a grounded base, an emitter to which the Zener diode is electrically connected, and a collector which is electrically connected to the deactivator, and the deactivating signal is outputted as a collector current in a case where the backward current turns on the transistor.

It is also preferable that the overvoltage monitor comprises a diode which prevents malfunction of the deactivator caused by a forward current of the Zener diode flowing into the deactivator.

In such a configuration, it is possible to configure a constant-voltage switching power supply which is less likely to malfunction.

Preferably, the switching transistor is a field effect transistor. Since a field-effect transistor can operate by a smaller current than that for a bipolar transistor, more stable switching operation and a more stable DC voltage output can be attained.

According to the invention, there is also provided an overvoltage output protector, electrically connected to a constant-voltage switching power supply which comprises a switching transistor converting a DC voltage obtained by smoothing an AC voltage supplied from an AC power source into a cyclic pulse signal, the overvoltage output protector comprising:

an overvoltage monitor, which judges whether a potential of the cyclic pulse signal is a predetermined value or more; and a deactivator, which turns off the switching transistor in a case where the overvoltage monitor judges that the potential of the cyclic pulse signal is the predetermined value or more.

Here, it is preferable that: the overvoltage monitor outputs a deactivation signal having a predetermined DC voltage, in a case where it is judged that the potential of the cyclic pulse signal is the predetermined value or more; and the deactivator maintains a base potential of the switching transistor at a deactivating potential at which the switching transistor is turned off, in a case where the overvoltage monitor outputs the deactivation signal.

Here, it is further preferable that the deactivator comprises a self holding circuit which maintains the base potential of the switching transistor at the deactivating potential even in a case where the overvoltage monitor stops outputting the deactivation signal, after the deactivator is once activated.

According to the invention, there is also provided an electronic apparatus, connected to a constant-voltage DC power supply provided with a first controller which is externally controlled to vary a DC output voltage to be supplied, the electronic apparatus comprising:

an overvoltage detector, which detects whether an internal potential of the electronic apparatus is a predetermined value or more; and a second controller, which operates the first controller in a case where the overvoltage detector detects that the internal potential is the predetermined value or more, wherein the overvoltage detector comprises a self-holding circuit which maintains a state of the second controller once the overvoltage detector detects that the internal potential is the predetermined value or more.

In such a configuration, the overvoltage state in the electronic apparatus can be prevented from being continuously maintained, and furthermore, the power having the rated voltage is continuously supplied from the constant-voltage DC power supply device so that a large current causing heat generation can be prevented from flowing to a part of the circuits in the electronic apparatus.

More specifically, when the overvoltage in the electronic apparatus is detected, the output voltage of the constant-voltage DC power supply is dropped to be approximately 0V, that is, a much lower voltage than the rated voltage having no possibility that the overvoltage might be generated in the electronic apparatus. Thus, the inside of the electronic apparatus can be prevented from being brought into an overvoltage state. Since the overvoltage detector self-holds the overvoltage detection state after the overvoltage is once detected, the overvoltage detection state is held even if the first controller of the constant-voltage DC power supply is operated so that the output voltage is dropped. Even if the voltage in the electronic apparatus is dropped after the detection of the overvoltage to temporarily bring a state in which the overvoltage is not detected, it is possible to prevent the power having the rated voltage from being supplied from the constant-voltage DC power supply to the circuit in the electronic apparatus again, causing the inside of the electronic apparatus to be brought into the overvoltage state again.

Here, it is preferable that: the overvoltage detector comprises a Zener diode; and the self-holding circuit deactivates the second controller when the internal potential reaches a Zener voltage of the Zener diodes and maintains a deactivation state of the second controller even when the internal potential decreases lower than the Zener diode after the self-control circuit once deactivates the second controller.

Here, it is further preferable that: the first controller comprises a control terminal which sets the output DC voltage at a first voltage in a case where the control terminal is short-circuited to a predetermined potential, and which sets the output DC voltage at a second voltage lower than the first voltage in a case where the control terminal is brought into a high-impedance condition; the second controller comprises a first transistor having a collector electrically connected to the control terminal; the first transistor is turned on in a case where the overvoltage detector detects that the internal potential is less than the predetermined value, so that the control terminal is short-circuited to the predetermined potential; and the first transistor is turned off in a case where the overvoltage detector detects that the internal potential is the predetermined value or more, so that the control terminal is brought into the high-impedance condition.

The ON state of the first transistor indicates a state in which a base current to bring the first transistor into a saturation state flows so that a current flows through the collector to an emitter. The OFF state of the first transistor indicates a state in which the base current does not flow and the first transistor is brought into a shutoff condition so that the collector current does not flow.

While the overvoltage detector is not in the overvoltage detection state, the base current of the first transistor flows to bring the ON state, so that the control terminal connected to the collector is set to have the predetermined potential. Consequently, the first voltage (rated voltage) is output from the constant-voltage DC power supply. On the other hand, while the overvoltage detector is in the overvoltage detection state, the base current is cut off to bring the OFF state, so that the control terminal connected to the collector is maintained in the high impedance state. Consequently, the constant-voltage DC power supply is brought into a remote off state so that the output voltage is dropped to the second voltage (remote off voltage). Therefore, it is prevented that the power having the rated voltage is continuously supplied from the constant-voltage DC power supply, so that a large current causing heat generation can be prevented from flowing to a part of the circuits in the electronic apparatus.

Here, it is further preferable that the electronic apparatus further comprises an activator/deactivator, which turns on or off the first transistor to activate or deactivate the electronic apparatus, in a case where the overvoltage detector detects that the internal potential is less than the predetermined value.

In such a configuration, the first transistor is brought into the ON state so that the activator/deactivator is brought into a controllable state, and the first transistor is brought into an OFF state so that a remote off state in which the activator/deactivator is uncontrollable is established.

Here, it is further preferable that the activator/deactivator comprises a switch operable to cut off a base current of the first transistor.

Here, it is further preferable that: the activator/deactivator comprises a second transistor and a third controller which turns on or off the second transistor; and the base current of the first transistor is cut off in a case where the third controller turns off the second transistor.

In such a configuration, the base current can be cut off independently from the ON/OFF state of the switch and the detection state of the overvoltage detector.

It is also preferable that: the activator/deactivator allows to flow the base current in a case where the switch is turned on, and cut off the base current in a case where the switch is turned off; the third controller detects that an ON/OFF state of the switch; and the third controller turns on the second transistor when an ON state of the switch is detected on under a condition that the base current is cut off, maintains an ON state of the second transistor even if an OFF state of the switch is detected, and turns off the second transistor in a case where the OFF state of the switch is again detected after the ON state is again detected.

In such a configuration, the switch can configured as a momentary switch in which a contact is constituted only when it is actuated. It is also possible to carry out such power control that the power source is not activated immediately after the switch is brought into the ON state, but is turned ON after a self-check such as a failure diagnosis is carried out to confirm that the electronic apparatus is normal. Moreover, it is also possible to carry out such power control that the electronic apparatus is deactivated after necessary control for deactivation is executed.

Preferably, the constant-voltage DC power supply is provided as an AC-DC converter which converts an AC voltage supplied from a domestic plug socket into the output DC voltage having a predetermined potential.

In general, many electronic apparatuses are always connected to the domestic plug socket irrespective of the frequency of use. According to the above configuration, when some abnormality is occurred in the electronic apparatus which is kept connected to the domestic plug socket, it is prevented that the DC power is continuously supplied from the AC-DC converter so that it is possible to prevent a large current causing heat generation from continuously flowing to a part of the circuits in the electronic apparatus.

According to the invention, there is also provided an overvoltage protector, provided within an electronic apparatus and connected to a constant-voltage DC power supply provided with a first controller which is externally controlled to vary a DC output voltage to be supplied, the overvoltage output protector comprising:

an overvoltage detector, which detects whether an internal potential of the electronic apparatus is a predetermined value or more; and a second controller, which operates the first controller in a case where the overvoltage detector detects that the internal potential is the predetermined value or more, wherein the overvoltage detector comprises a self-holding circuit which maintains a state of the second controller once the overvoltage detector detects that the internal potential is the predetermined value or more.

Here, it is preferable that the constant-voltage DC power supply is provided within the electronic apparatus.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
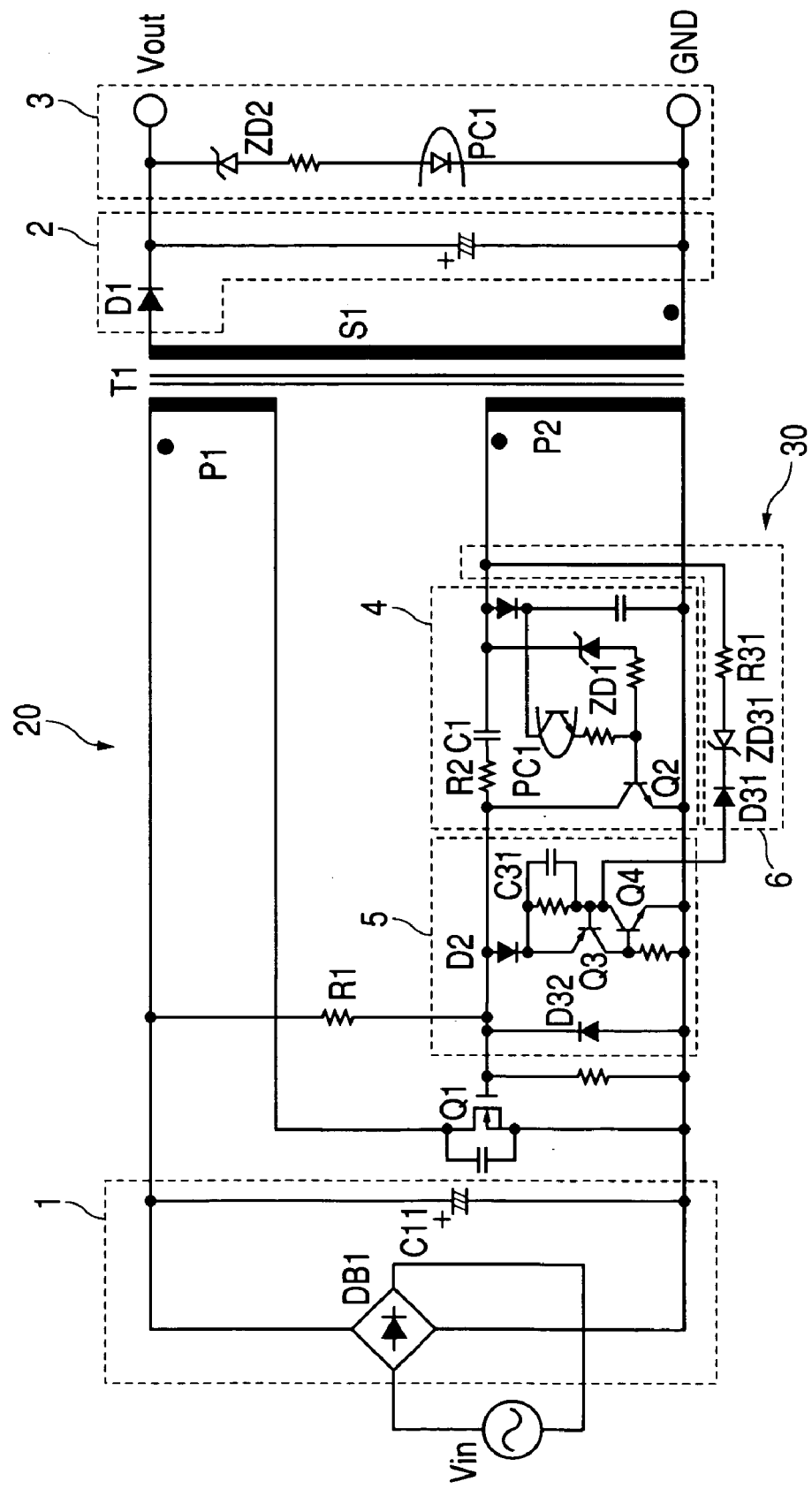
FIG. 1 is a circuit diagram showing a constant-voltage switching power supply according to a first embodiment of the invention.

A first embodiment of the invention will be described referring to FIGS. 1 and 2. Components similar to those in the related-art configuration will be designated by the same reference numerals and detailed explanations for those will be omitted here.

In this embodiment, the switching transistor Q1 is a field-effect transistor. The field-effect transistor can operate on a smaller current than that for a bipolar transistor thus allowing more stable switching operation and outputting a more stable DC voltage.

A constant-voltage switching power supply 20 in this embodiment comprises an overvoltage detector 6 and a switching transistor deactivator 5 to constitute an overvoltage output protecting circuit 30. The overvoltage detector 6 monitors the voltage of a high-frequency pulse output from the switching transistor Q1 through a second primary coil P2 of the high-frequency transformer T1 and operates the switching transistor deactivator 5 when the negative voltage of the high-frequency pulse induced to the second primary coil P2 reaches a predetermined voltage. The switching transistor deactivator 5 maintains the base voltage of the switching transistor Q1 to be a constant-voltage at which the switching transistor Q1 is turned OFF.

When some abnormality is occurred on the voltage comparator/detector 3, for example, due to the breakdown of the photocoupler PC1, the constant-voltage control of the duty ratio controller 4 cannot be carried out so that the positive voltage of a high-frequency pulse (P1 in FIG. 2) output from the switching transistor Q1 is raised as indicated by a chain line of P1. Consequently, the negative voltage of a high-frequency pulse (P2 in FIG. 2) induced to the second primary coil P2 is also raised as indicated by a chain line of P2. At this time, a charging current for controlling a constant-voltage does not flow from the photocoupler PC1 to the base of the transistor Q2 for controlling the duty ratio controller 4 and the switching transistor Q1 is continuously turned ON-OFF by a charging/discharging current supplied from the Zener diode ZD1 (Q1 gate in FIG. 2), so that the voltage of the high-frequency pulse output from the switching transistor Q1 is gradually raised while maintaining a constant duty ratio. Accordingly, the voltage (S1 in FIG. 2) of the high-frequency pulse of the secondary coil S1 of the high-frequency transformer T1 is raised as indicated by a chain line of S1, and the DC output voltage is thus raised to be an overvoltage.

In the overvoltage detector 6, if the negative voltage of a high-frequency pulse (P2 in FIG. 2) induced to the second primary coil P2 increases, a backward current flows to the Zener diode ZD31 when the Zener voltage of the Zener diode ZD31 is reached. By the backward current of the Zener diode ZD31, the switching transistor deactivator 5 is operated. A resistor R31 is a current limiting resistor for the backward current of the Zener diode ZD31 and the value of a current flowing to the gate of a transistor Q3 is determined by the resistance value of the resistor R31. Moreover, a diode D31 serves to prevent a current from flowing into the switching transistor deactivator 5 to cause the malfunction of the transistor Q3 or a transistor Q4 by the positive voltage of the high-frequency pulse induced to the second primary coil P2.

The switching transistor deactivator 5 maintains the base voltage of the switching transistor Q1 to be a constant-voltage at which the switching transistor Q1 is turned OFF by the backward current flowing to the Zener diode ZD31 of the overvoltage detector 6. By the backward current flowing to the Zener diode ZD31, the base current of the transistor Q3 flows so that the transistor Q3 is turned ON. Consequently, the base current of the transistor Q4 flows so that the transistor Q4 is turned ON. The gate of the switching transistor Q1 is discharged through a diode D2, the transistor Q3 and the transistor Q4 so that the voltage is dropped to be a constant voltage at which the switching transistor Q1 is turned OFF.

The switching transistor deactivator 5 is a self-holding circuit and the collector current of the transistor Q4 flows to the base of the transistor Q3 so that the ON state of the transistor Q3 is held. Even if the negative voltage of the high-frequency pulse induced to the second primary coil P2 is dropped to be lower than the Zener voltage of the Zener diode ZD31, consequently, the ON states of the transistor Q3 and the transistor Q4 are held so that the gate voltage of the switching transistor Q1 can be continuously maintained to be a voltage at which the switching transistor Q1 is turned OFF. The switching transistor deactivator 5 is also a so-called hysteresis circuit. A capacitor C31 serves to prevent the switching transistor deactivator 5 from malfunctioning due to a noise. Moreover, a diode D32 serves to stabilize the gate voltage of the switching transistor Q1.

Thus, the overvoltage of the DC output voltage is detected at the primary side of the high-frequency transformer T1 to stop the switching operation of the switching transistor Q1. When some abnormality is occurred on the secondary side of the high-frequency transformer T1 of the constant-voltage switching power supply 20, therefore, it is possible to prevent the control of the switching transistor Q1 from being disabled to cause the DC output voltage to be the overvoltage. The voltage having an overvoltage detected is determined by the Zener voltage of the Zener diode ZD31 of the overvoltage detector 6 so that the output overvoltage of the constant-voltage switching power supply 20 can be protected properly.

Figure 3:
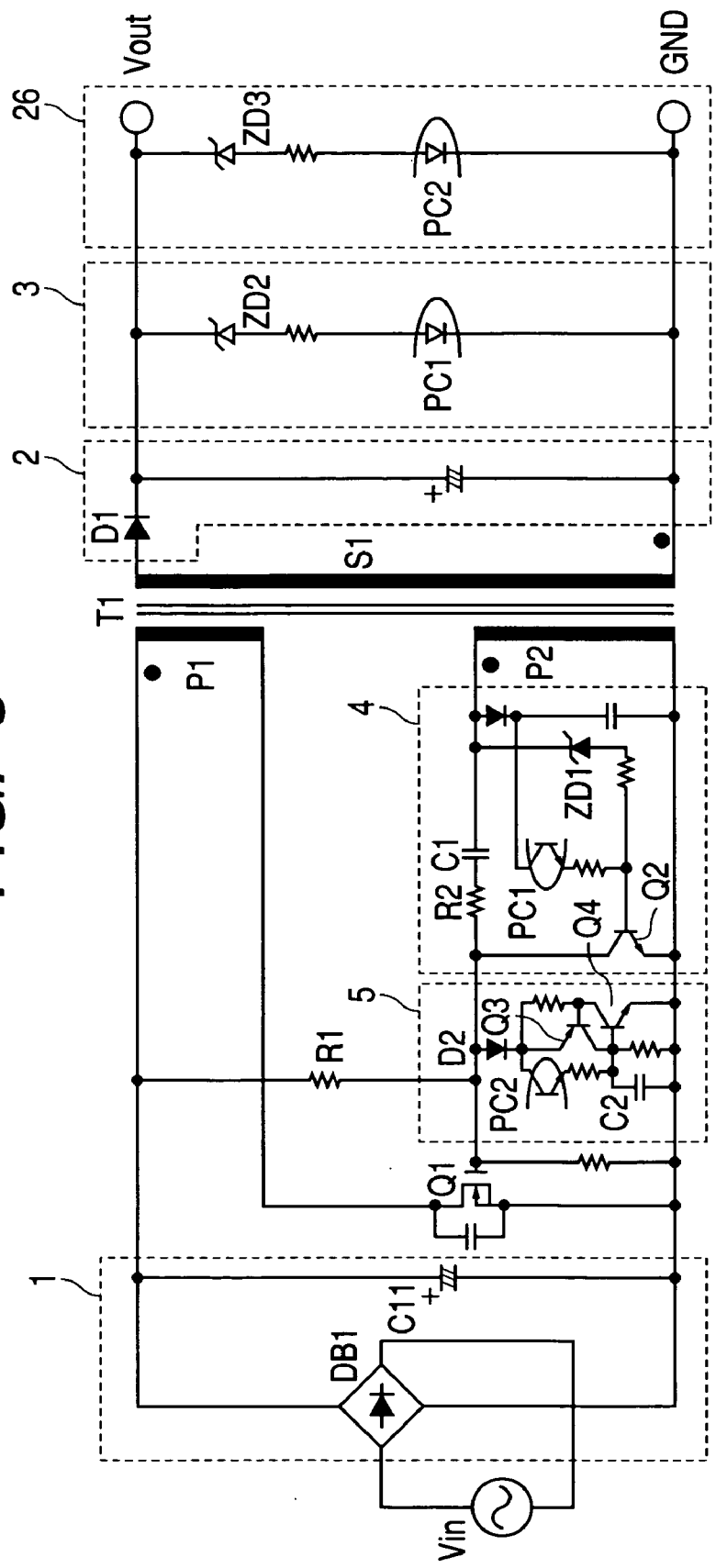
FIG. 3 is a circuit diagram showing a related-art constant-voltage switching power supply.

Furthermore, since it is not necessary to use the photo-coupler PC2 (FIG. 3) which is provided across the primary and secondary sides of the high-frequency transformer, the number of the components of the circuit can be decreased. As a result, the component mounting space of the constant-voltage switching power supply 20 can be reduced.

In the embodiment, the switching transistor Q1 may be a bipolar transistor. The bipolar transistor has larger power consumption than a field-effect transistor and shows slightly poorer switching characteristics. However, the bipolar transistor is less costly and reduces the total cost of the constant-voltage switching power supply.

In the embodiment, a transistor may be provided between the overvoltage detector 6 and the switching transistor deactivator 5.

Figure 4:
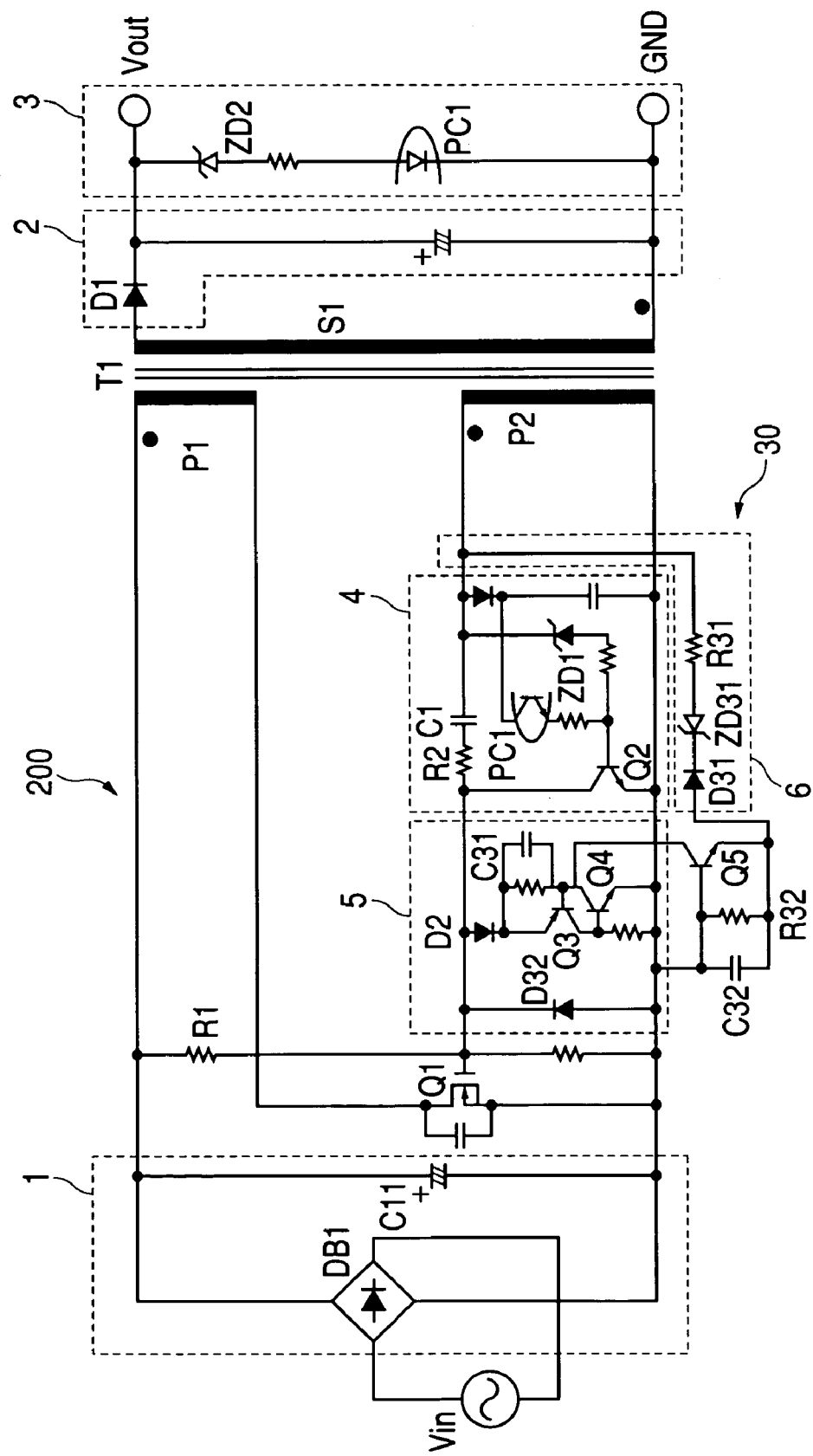
FIG. 4 is a circuit diagram showing a constant-voltage switching power supply according to a second embodiment of the invention.

FIG. 4 shows a constant-voltage switching power supply 200 having such a configuration as a second embodiment of the invention. The similar components are designated by the same reference numerals as the first embodiment, and detailed explanations for them will be omitted here.

In this embodiment, a transistor Q5 has a base grounded, an emitter connected to a Zener diode ZD31 of an overvoltage detector 6 through a diode D31, and a collector connected to a transistor Q4 of a switching transistor deactivator 5. A resistor R32 connected between the base and the emitter of the transistor Q5 is a resistor for absorbing a leakage current to prevent the transistor Q5 from malfunctioning due to the leakage current, and a capacitor C32 is for absorbing a high-frequency noise to prevent the transistor Q5 from malfunctioning due to the high-frequency noise.

In the overvoltage detector 6, if the negative voltage of a high-frequency pulse induced to a second primary coil P2 increases, when an electric potential difference between the negative voltage of the high-frequency pulse and the emitter voltage of the transistor Q5 reaches the Zener voltage of the Zener diode ZD31, a backward current flows to the Zener diode ZD31. In other words, when an electric potential difference between the negative voltage of the high-frequency pulse and the GND reaches the sum of a voltage between the base and the emitter of the transistor Q5, the voltage of the diode D31 and the Zener voltage of the Zener diode ZD31. By the backward current of the Zener diode ZD31, the switching transistor deactivator 5 is operated.

Figure 2:
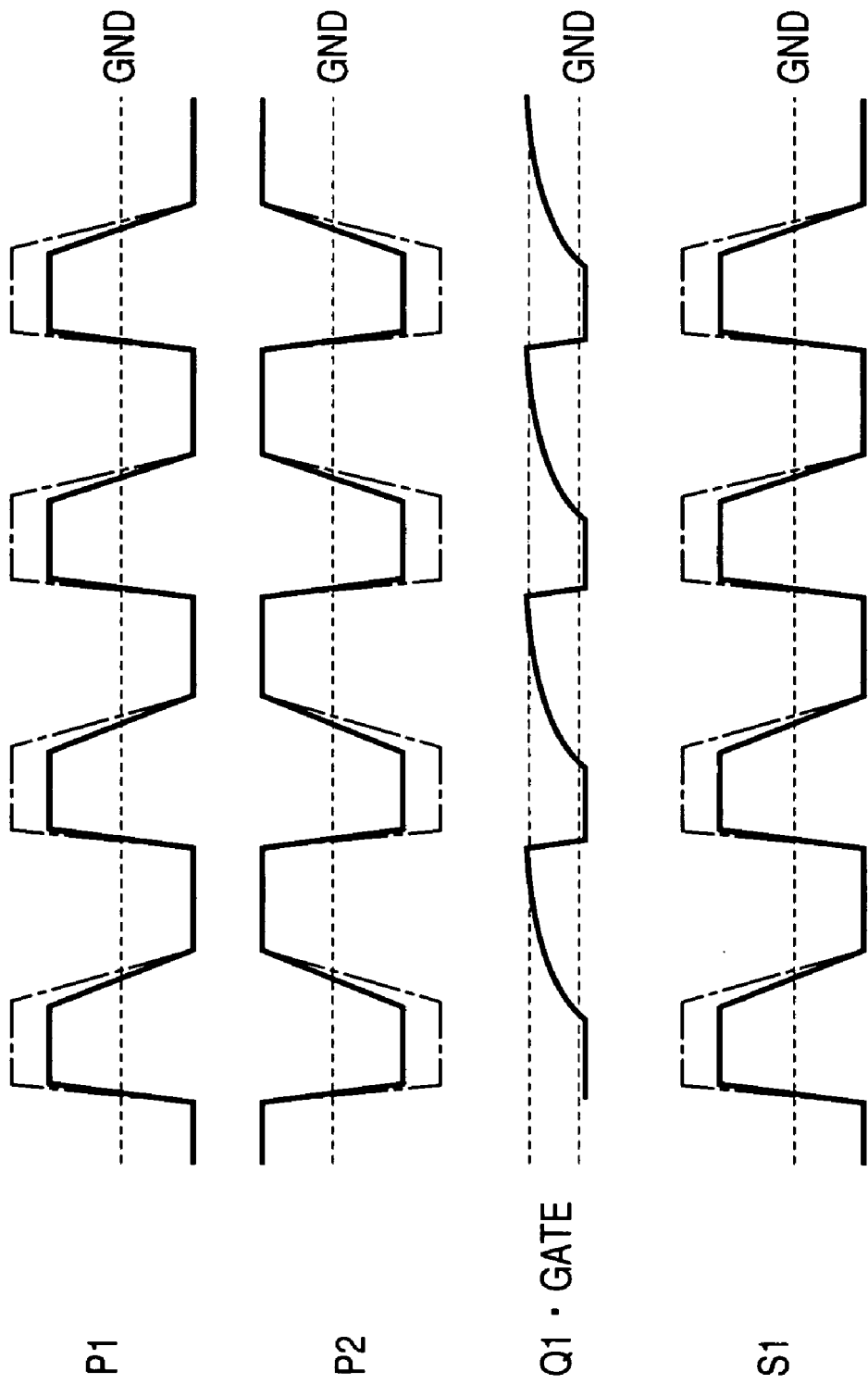
FIG. 2 is a graph showing the voltage waveforms of essential portions of the constant-voltage switching power supply.

In the constant-voltage switching power supply 20 shown in FIG. 1, the backward current flows to the Zener diode ZD31 when the electric potential difference between the negative voltage of the high-frequency pulse induced to the second primary coil P2 and the gate voltage of the switching transistor Q1 reaches the Zener voltage of the Zener diode ZD31. As shown in FIG. 2, the gate voltage of the switching transistor Q1 fluctuates with respect to the GND potential in accordance with a fluctuation in an input voltage (P1) applied to a high-frequency transformer T1. On the other hand, a constant-voltage switching power supply 200 in this embodiment can detect the overvoltage of a DC output voltage with higher precision because the emitter voltage of the transistor Q5 is obtained by subtracting the base-emitter voltage of the transistor Q5 from the GND, so that the fluctuation in the voltage for the voltage input to the high-frequency transformer T1 is very small.

Figure 5:
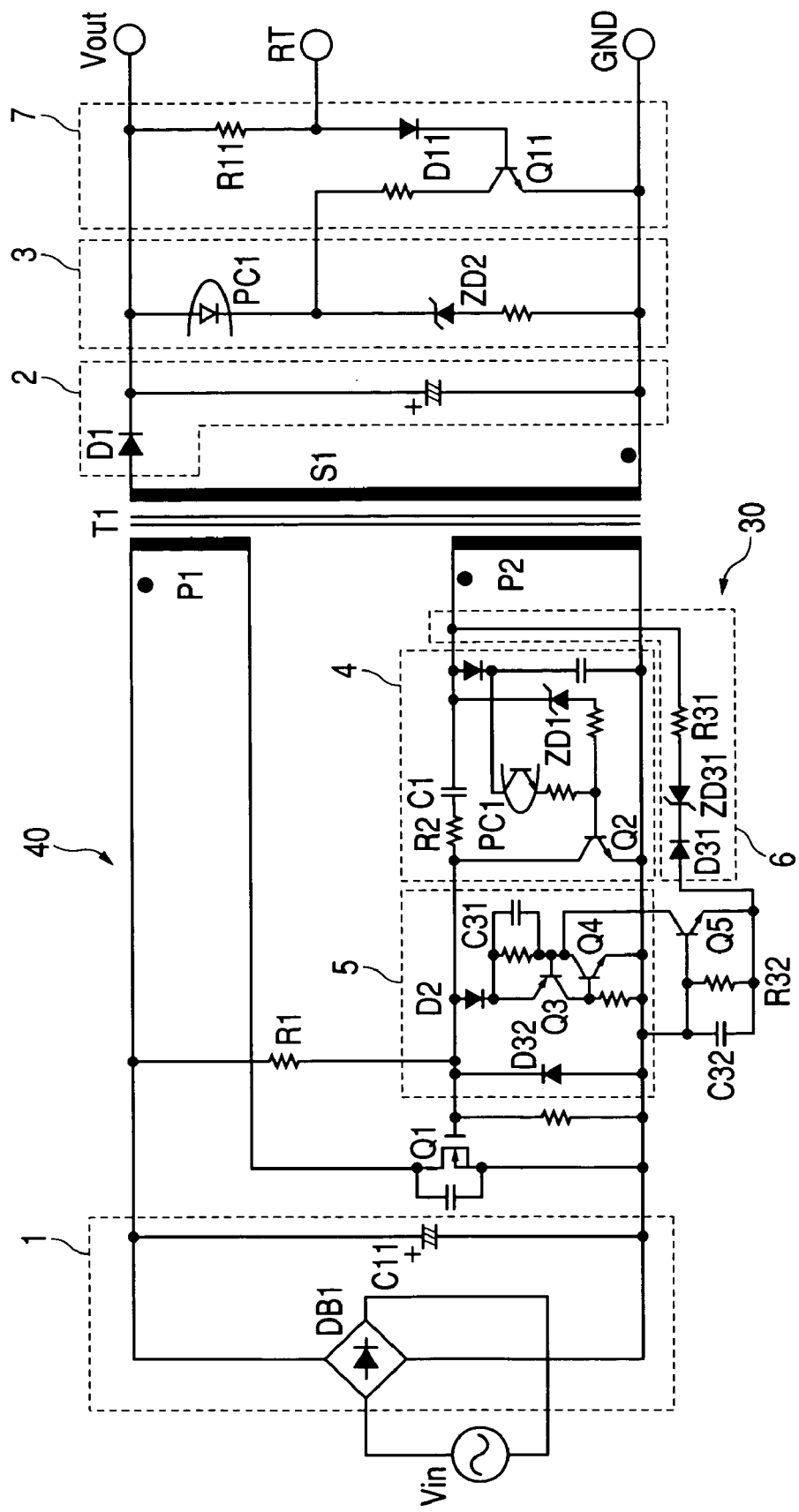
FIG. 5 is a circuit diagram showing a constant-voltage switching power supply according to a third embodiment of the invention.

FIG. 5 shows a constant-voltage switching power supply 40 according to a third embodiment of the invention. The similar components are designated by the same reference numerals as the above embodiments, and detailed explanations for them will be omitted here.

In addition to the configuration of the second embodiment, this embodiment comprises an external controller 7 capable of externally controlling an output voltage. The external controller 7 has an external control transistor Q11 for externally operating the output overvoltage protecting circuit 30. The external control transistor Q11 has a collector connected to the cathode side of a Zener diode ZD2 and an emitter connected to a GND terminal. When the base current of the external control transistor Q11 flows so that the external control transistor Q11 is turned ON, the Zener diode ZD2 is bypassed, the coupler current of a photocoupler PC1 flows and the output overvoltage protecting circuit 30 is operated so that an output voltage is dropped from a rated voltage of 42V to a remote off voltage of approximately 1.4V.

An external control terminal RT is connected to the base of the external control transistor Q11 and the external control terminal RT is subjected to pull-up to have the electric potential of a Vout terminal through a resistor R11. When the base current of the external control transistor Q11 flows in a state that the external control terminal RT is open or has a high impedance, the external control transistor Q11 is turned ON. When the electric potential of the external control terminal RT is short-circuited to be lower than the electric potential of the Vout terminal, the base current stops flowing so that the external control transistor Q11 is turned OFF.

Figure 6:
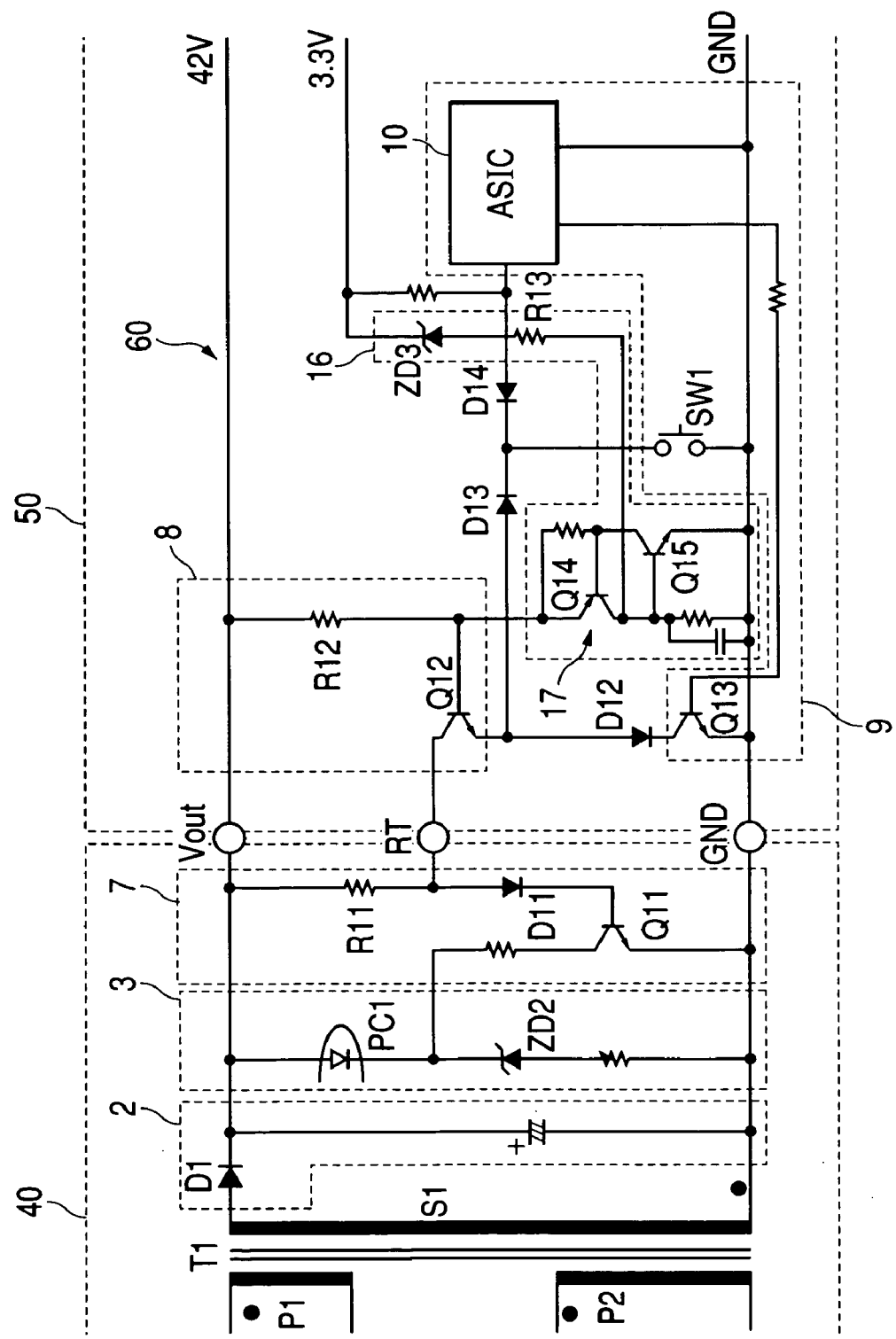
FIG. 6 is a circuit diagram showing an electronic apparatus connected to the constant-voltage switching power supply of FIG. 5.

FIG. 6 is a circuit diagram showing a part of the internal circuit of an electronic apparatus 50 to which the constant-voltage switching power supply 40 is connected.

An overvoltage protecting circuit 60 of the electronic apparatus 50 has an overvoltage detector 16 for detecting the overvoltage of a circuit in the electronic apparatus 50, a remote controller 8 for operating the external controller 7 of the constant-voltage switching power supply 40, and an activator/deactivator 9 for turning ON/OFF the power source of the electronic apparatus 50.

The remote controller 8 comprises a transistor Q12 having a collector connected to the external control terminal RT, an emitter connected to the activator/deactivator 9 which will be described below, and a base pulled up to the electric potential of the Vout terminal through a resistor R12. The resistor R12 is set to have a resistance value which is almost equal to that of the resistor R11 of the external controller 7. When the base current of the transistor Q12 flows, the transistor Q12 is turned ON to electrically connect the external control terminal RT to the GND terminal through the activator/deactivator 9. Accordingly, the base current stops flowing so that the transistor Q11 of the external controller 7 is turned OFF. As a result, a DC voltage of 42V as the rated voltage is output between the Vout terminal and the GND terminal.

On the other hand, if the base current of the transistor Q12 does not flow, the transistor Q12 is turned OFF. Consequently, the external control terminal RT is set to have a high impedance so that the base current flows and the transistor Q11 of the external controller 7 is thus turned ON. As a result, the output overvoltage protecting circuit 30 of the constant-voltage switching power supply 40 is operated so that a DC voltage of approximately 1.4V as the remote off voltage is output between the Vout terminal and the GND terminal.

The activator/deactivator 9 comprises: a power switch SW1 for short-circuiting/opening a portion between the emitter of the transistor Q12 of the remote controller 8 and the GND terminal; a transistor Q13 for short-circuiting/opening a portion between the emitter of the transistor Q12 of the remote controller 8 and the GND terminal; and an ASIC (Application Specific Integrated Circuit) 10. The power switch SW1 is a momentary switch which is turned ON only when it is actuated, and the ON/OFF state thereof is input to the ASIC 10 to thereby ON/OFF control the transistor Q13 having a base connected to the ASIC 10. Moreover, there are provided a diode D13 and a diode D14 which serve to regulate a current direction to be one direction, thereby preventing the malfunction of the circuit.

The overvoltage detector 16 has such a circuit structure as to include a Zener diode ZD3 and a self-holding circuit 17 to be operated with the Zener current of the Zener diode ZD3. The electronic apparatus 50 comprises a DC-DC converter (not shown) for carrying out a DC-DC conversion over a rated output voltage of 42V in the constant-voltage switching power supply 40 to generate a power voltage of 3.3V therein. The Zener diode ZD3 is provided for detecting the overvoltage of a power voltage 3.3V line in the electronic apparatus 50, and a Zener voltage of the Zener diode ZD3 is set to be approximately 5 to 10V. The reference numeral R13 denotes a current limiting resistor for the Zener current of the Zener diode ZD3.

When the power voltage of 3.3V in the electronic apparatus 50 becomes an overvoltage to reach the Zener voltage of the Zener diode ZD3, the Zener current flows to the Zener diode ZD3 so that the self-holding circuit 17 constituted by a transistor Q14 and a transistor Q15 is operated. The Zener current of the Zener diode ZD3 flows to the base of the transistor Q15 so that the transistor Q15 is turned ON, and the collector current of the transistor Q15 thus flows. Consequently, the base current of the transistor Q14 flows so that the transistor Q14 is turned ON and the collector current of the transistor Q14 thus flows. Even if a power voltage in the electronic apparatus 50 is lower than the Zener voltage of the Zener diode ZD3 so that the Zener current stops flowing, the collector current of the transistor Q14 flows to the base of the transistor Q15 so that the ON state of the transistor Q15 is held and a state in which the overvoltage is detected is thus maintained.

While the overvoltage detector 16 detects the overvoltage, the collector current of the transistor Q14 flows so that the current flowing to the base of the transistor Q12 of the remote controller 8 is pulled toward the collector of the transistor Q14 (approximately 0.7V applied between the base and the emitter of the transistor Q15) which has a lower electric potential than the electric potential of the base of the transistor 012 (approximately 1.4V obtained by adding approximately 0.7V applied between the base and the emitter of the transistor Q12 to a voltage drop of approximately 0.7V by the diode D12). Consequently, the base current of the transistor Q12 is cut off. Accordingly, the collector current of the transistor Q12 does not flow, and the external control terminal RT is set to have a high impedance, so that a DC voltage of approximately 1.4V to be a remote off voltage is output between the Vout terminal of the constant-voltage switching power supply 40 and the GND terminal (a voltage obtained by adding a voltage between the base and the emitter of the transistor Q11 of approximately 0.7V to a voltage drop of approximately 0.7V by the diode D11).

In other words, the external control terminal RT of the constant-voltage switching power supply 40 is set to have a high impedance so that the output voltage of the constant-voltage switching power supply 40 is dropped to be a remote off voltage (approximately 1.4V), while the overvoltage detector 16 is set in the overvoltage detection state. Consequently, it is avoided a problematic situation that the rated voltage of 42V is continuously supplied from the constant-voltage switching power supply 40 to the circuit in the electronic apparatus 50 in a state that such an abnormality that the power voltage in the electronic apparatus becomes the overvoltage is generated. As a result, it is possible to prevent a problem that a large current flows to a part of the circuits in the electronic apparatus 50 to generate heat.

In this embodiment, the constant-voltage switching power supply 40 is an external AC adapter which inputs an AC voltage from a domestic plug socket, and converts the AC voltage into a predetermined DC voltage and outputs the same DC voltage. Even when some abnormality is occurred in the electronic apparatus which is kept connected to the domestic plug socket, owing to the existence of the overvoltage protecting circuit 60, it is avoided that a DC power is continuously supplied from the AC adaptor and a large current flows to a part of the circuits in the electronic apparatus, resulting heat generation. It is apparent that the same advantage can be obtained in a case where the constant-voltage switching power supply 40 is provided in an electronic apparatus.

Next, description will be given to the power control of the electronic apparatus 50 which is carried out by the ASIC 10.

When the power switch SW1 is turned ON in a state that the power source of the electronic apparatus 50 is OFF state in which the base current of the transistor Q12 is cut off, the base current of the transistor Q12 flows so that the output voltage of the constant-voltage switching power supply 40 increases from the remote off voltage of an approximately 1.4V to the rated voltage of 42V. Consequently, a DC power having the rated voltage of 42V is supplied to the circuit in the electronic apparatus 50 so that the power source can be turned ON. The ASIC 10 turns ON the transistor Q13 when detecting the ON state of the power switch SW1, and also maintains the control state of the transistor Q13 to be the ON state after detecting the OFF state of the power switch SW1. Therefore, even if the power switch SW1 is turned OFF, the base current of the transistor Q12 continuously flows so that the output voltage of the constant-voltage switching power supply 40 is maintained to be the rated voltage. The ASIC 10 carries out a self-check such as a failure diagnosis to confirm that the electronic apparatus 50 is normal, and then turns ON the power source. Since the ASIC 10 maintains the control state of the transistor Q13 to be the ON state, the power ON state of the electronic apparatus 50 is maintained. When detecting the ON to OFF state of the power switch SW1 again, the ASIC 10 confirms that necessary control for the deactivation of the electronic apparatus 50 and then turns OFF the transistor Q13 so that the base current of the transistor Q12 is cut off. Consequently, the output voltage of the constant-voltage switching power supply 40 is dropped to be the remote off voltage so that the power source of the electronic apparatus is turned OFF.

Although the invention has been described in its preferred form with a certain degree of particularity, obviously many changes and variations are possible therein. It is therefore to be understood that the present invention may be practiced than as specifically described herein without departing from scope and the spirit thereof.

What is claimed is:

1. A constant-voltage switching power supply, comprising:
    a smoother, which converts an AC voltage supplied from an AC power source into a first DC voltage;

a switching transistor, which converts the first DC voltage into a first cyclic pulse signal;

a transformer, which voltage-transforms the first cyclic pulse signal to obtain a second cyclic pulse signal, the transformer comprising a first primary coil to which the first cyclic pulse signal is applied, a second primary coil at which a third cyclic pulse signal corresponding to the first cyclic pulse signal is induced;

an overvoltage monitor, which monitors a potential of the third cyclic pulse signal to judge whether a potential of the first cyclic pulse signal is a predetermined value or more, the overvoltage monitor comprising a Zener diode through which a backward current flows in a case where the potential of the third cyclic pulse signal reaches a Zener voltage of the Zener diode; and a deactivator, which turns off the switching transistor when the backward current flows through the Zener diode;

wherein:

the overvoltage monitor comprises a transistor having a grounded base, an emitter to which the Zener diode is electrically connected, and a collector which is electrically connected to the deactivator; and the deactivator turns off the switching transistor when the backward current turns on the transistor.

2. An electronic apparatus, connected to a constant-voltage DC power supply provided with a first controller which is externally controlled to vary a DC output voltage to be supplied, the electronic apparatus comprising:

an overvoltage detector, which detects whether a power voltage of the electronic apparatus which is generated from a rated output voltage in the constant-voltage DC power supply is a predetermined value or more, the overvoltage detector comprising a Zener diode; and a second controller, which controls the first controller to vary the DC output voltage of the constant-voltage DC power supply in a case where the overvoltage detector detects that the power voltage is the predetermined value or more, wherein the overvoltage detector deactivates the second controller when the power voltage reaches a Zener voltage of the Zener diode and maintains a deactivated state of the second controller even when the power voltage decreases lower than the Zener voltage of the Zener diode after the second controller is once deactivated.

3. The electronic apparatus as set forth in claim 2, wherein:

the first controller comprises a control terminal which sets the output DC voltage at a first voltage in a case where the control terminal is short-circuited to a predetermined potential, and which sets the output DC voltage at a second voltage lower than the first voltage in a case where the control terminal is brought into a high-impedance condition;

the second controller comprises a first transistor having a collector electrically connected to the control terminal;

the first transistor is turned on in a case where the overvoltage detector detects that the internal potential is less than the predetermined value, so that the control terminal is short-circuited to the predetermined potential; and the first transistor is turned off in a case where the overvoltage detector detects that the internal potential is the predetermined value or more, so that the control terminal is brought into the high-impedance condition.

4. The electronic apparatus as set forth in claim 3, further comprising an activator/deactivator, which turns on or off the first transistor to activate or deactivate the electronic apparatus, in a case where the overvoltage detector detects that the internal potential is less than the predetermined value.

5. The electronic apparatus as set forth in claim 4, wherein the activator/deactivator comprises a switch operable to cut off a base current of the first transistor.

6. The electronic apparatus as set forth in claim 5, wherein:

the activator/deactivator comprises a second transistor electrically connected to the first transistor and a third controller which turns on or off the second transistor; and the base current of the first transistor is cut off in a case where the third controller turns off the second transistor.

7. The electronic apparatus as set forth in claim 6, wherein:

the activator/deactivator allows to flow the base current in a case where the switch is turned on, and cut off the base current in a case where the switch is turned off;

the third controller detects that an ON/OFF state of the switch; and the third controller turns on the second transistor when an ON state of the switch is detected on under a condition that the base current is cut off, maintains an ON state of the second transistor even if an OFF state of the switch is detected, and turns off the second transistor in a case where the OFF state of the switch is again detected after the ON state is again detected.

8. The electronic apparatus as set forth in claim 2, wherein the constant-voltage DC power supply is provided as an AC-DC converter which converts an AC voltage supplied from a domestic plug socket into the output DC voltage having a predetermined potential.

9. An overvoltage protector, provided within an electronic apparatus and connected to a constant-voltage DC power supply provided with a first controller which is externally controlled to vary a DC output voltage to be supplied, the overvoltage output protector comprising:

an overvoltage detector, which detects whether a power voltage of the electronic apparatus which is generated from a rated output voltage in the constant-voltage DC power supply is a predetermined value or more, the overvoltage detector comprising a Zener diode; and a second controller, which controls the first controller to vary the DC output voltage of the constant-voltage DC power supply in a case where the overvoltage detector detects that the power voltage is the predetermined value or more, wherein the overvoltage detector deactivates the second controller when the power voltage reaches a Zener voltage of the Zener diode and maintains a deactivated state of the second controller even when the power voltage decreases lower than the Zener voltage of the Zener diode after the second controller is once deactivated.

10. The overvoltage protector as set forth in claim 9, wherein the constant-voltage DC power supply is provided within the electronic apparatus.

* * * * *